United States Patent [19]

Foresto

[11] 4,373,453
[45] Feb. 15, 1983

[54] APPARATUS AND METHOD FOR UTILIZING HOT WASTE GASES

[76] Inventor: Samuel Foresto, 243 Willis Ave., Mineola, N.Y. 11501

[21] Appl. No.: 302,487

[22] Filed: Sep. 16, 1981

Related U.S. Application Data

[63] Continuation-in-part of Ser. No. 221,974, Jan. 2, 1981, Pat. No. 4,317,417.

[51] Int. Cl.³ ............................................. F23J 3/00
[52] U.S. Cl. .................................. 110/216; 122/1 A;
122/20 B; 165/DIG. 2; 431/215
[58] Field of Search .............. 165/DIG. 2, DIG. 12,
165/47; 110/233, 304, 306, 216; 122/1 A, 20 B;
431/215

[56] References Cited

U.S. PATENT DOCUMENTS

| | | | |
|---|---|---|---|
| 2,582,830 | 1/1952 | Hawley | 122/1 A |
| 2,594,471 | 4/1952 | Marshall | 122/1 A |
| 3,844,233 | 10/1974 | Fishback | 122/20 B X |
| 4,050,627 | 9/1977 | Mayer | 165/DIG. 2 |
| 4,100,887 | 7/1978 | Malmstrom et al. | 122/390 X |
| 4,320,869 | 3/1982 | Ebert | 165/DIG. 2 |

*Primary Examiner*—Edward G. Favors
*Attorney, Agent, or Firm*—Bauer & Amer

[57] ABSTRACT

An apparatus and method for utilizing the heat of waste gases by exhausting the same at the head of a flue from a source into a heat extractor where the hot gases are caused to move and turbulate about heat exchanger walls to release their heat to such walls before being exhausted downward to the atmosphere so that fluids moved through the heat exchanger may be heated to perform useful work.

53 Claims, 11 Drawing Figures

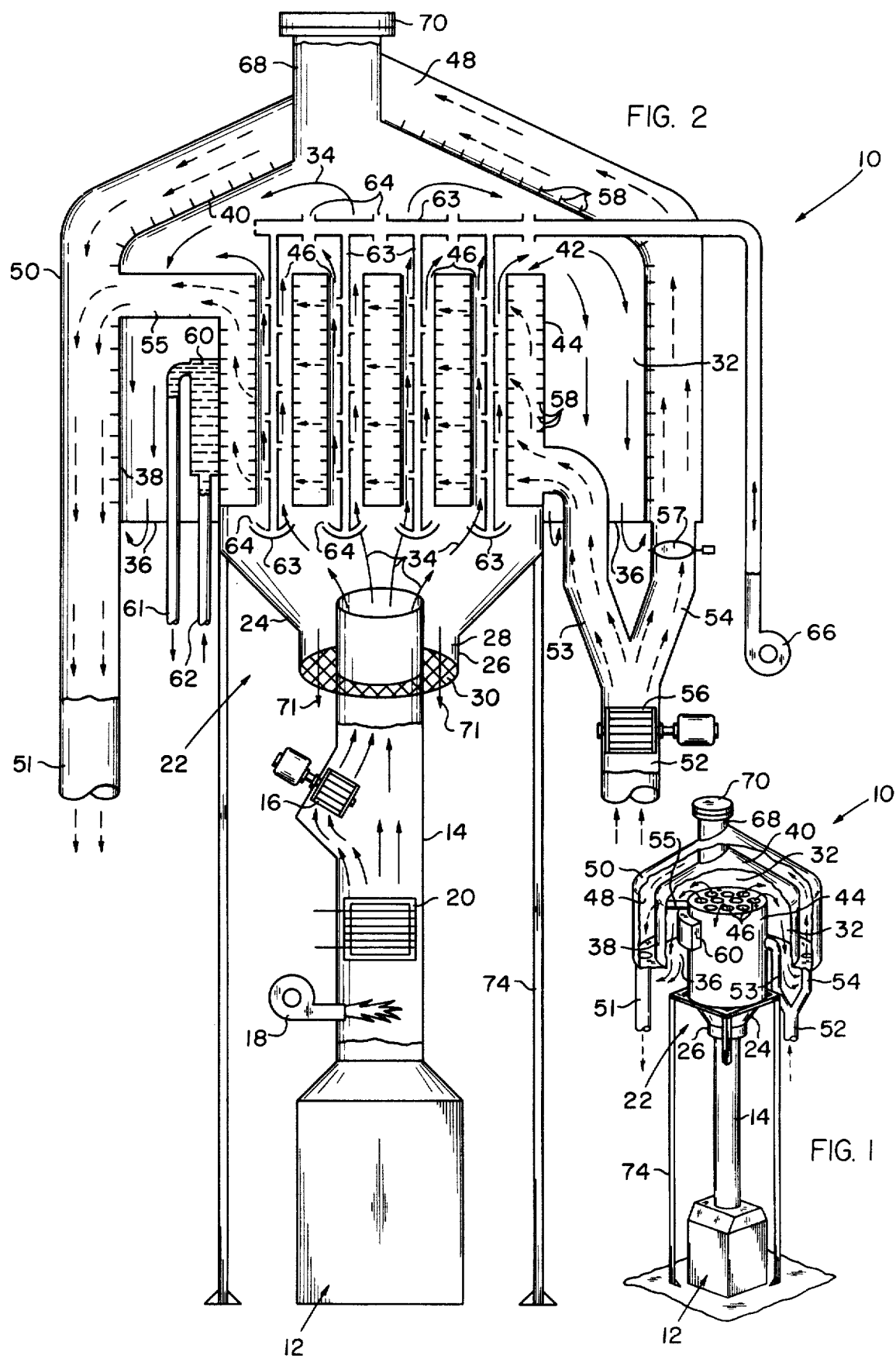

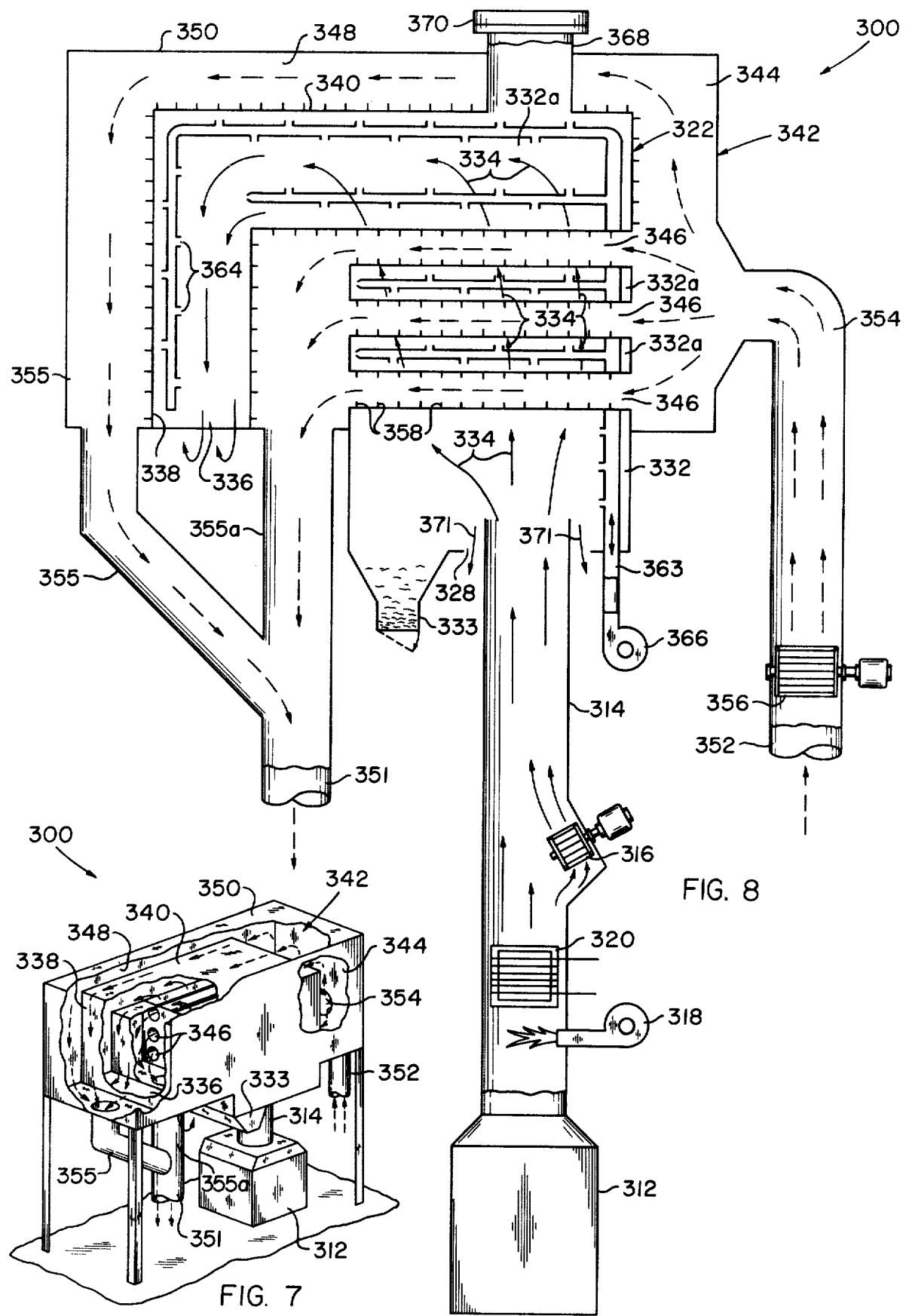

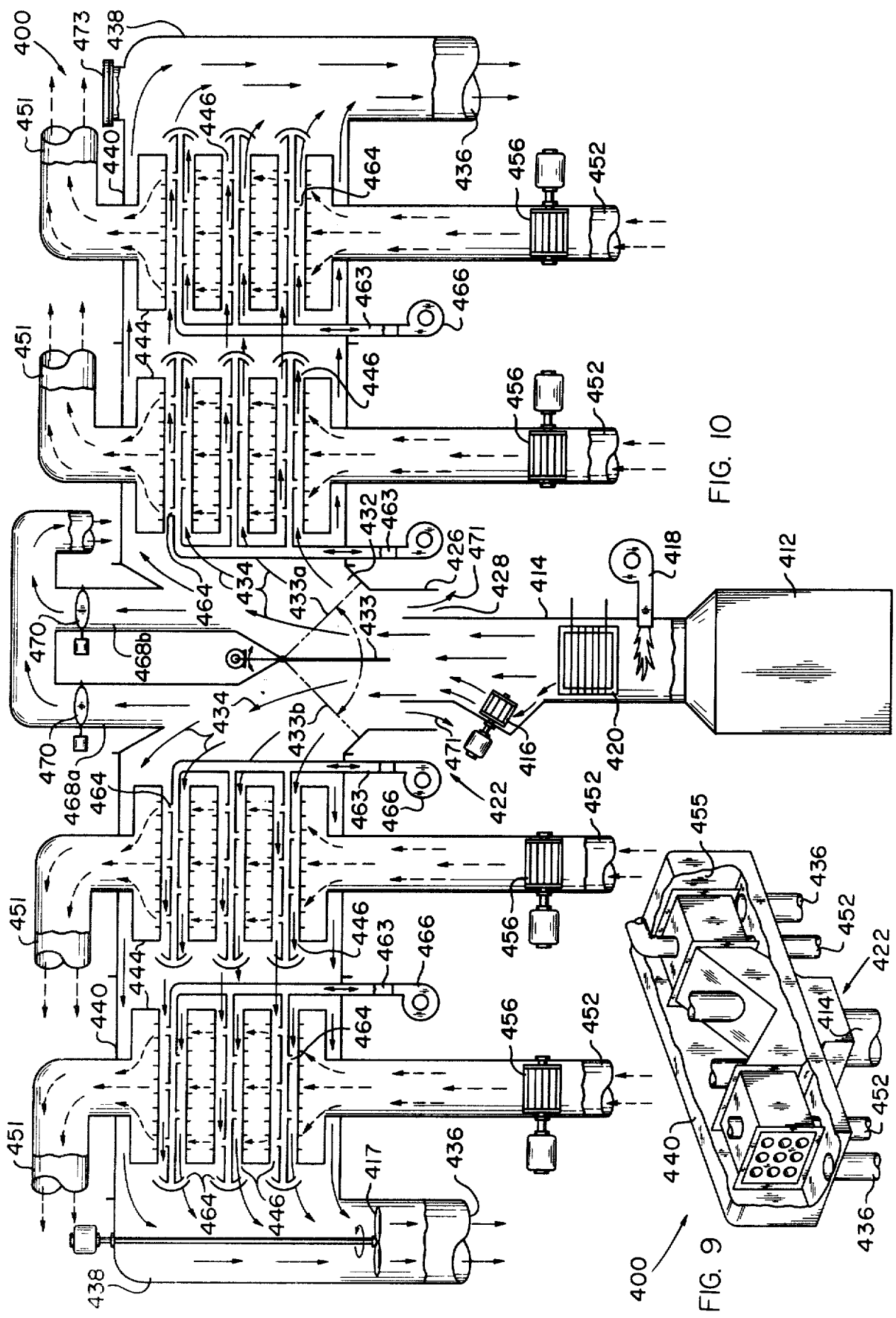

APPARATUS AND METHOD FOR UTILIZING HOT WASTE GASES

This application is a continuation-in-part of my copending United States patent application Ser. No. 221,974 filed Jan. 2, 1981 U.S. Pat. No. 4,317,417.

The present invention relates to an apparatus for extracting, accumulating and utilizing the heat of waste gases produced by a burning source, and to a method therefor.

The apparatus and method of the present invention may be employed in connection with any structure that produces waste gases. For example, in the operation of garbage or other waste disposal incinerators or fireboxes in which huge amounts of refuse is burned, the common practice is to vent the hot uncleaned waste gases directly upward into the atmosphere. At times the hot unclean waste gases are caused to flow through scrubbers intended to remove much, if not all, of the particles of pollution and noxious fumes from the gases before they are exhausted to the atmosphere.

Attempts made to utilize some of the heat of the waste gases are suggested in the exemplary U.S. Pat. Nos. 236,141, 3,064,638, 4,050,628 and 4,206,742.

By contrast, the desideratum of the present invention is to teach an apparatus and method for extracting huge amounts of the available heat from the waste gases and for utilizing the same to perform useful work.

An object of the invention is to immediately extract and accumulate the heat of the waste gases at the exhaust of the head of the flue that conducts the waste gases from the source. Thereafter, the gases release their heat into the heat extractor by causing the gases to turbulate in their flow through the heat extractor before being released to the atmosphere in a downward direction of flow. The heat accumulated in the extractor is in heat exchange relation with a fluid, in the form of a liquid and/or gas, that is clean and uncontaminated by the waste gases so as to enable the same to be used for any desired purpose including room heating and/or driving work performing devices, as turbines and the like.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings wherein:

FIG. 1 is a perspective view of an apparatus constructed according to the teaching of the invention with parts thereof removed;

FIG. 2 is an enlarged vertical cross-sectional view of the apparatus of FIG. 1;

FIG. 7 is a further embodiment of the apparatus according to the teaching of the invention with parts thereof removed;

FIG. 8 is an enlarged vertical cross-sectional view of the apparatus of FIG. 7;

FIG. 9 is still another embodiment of the apparatus constructed according to the teaching of the invention with parts thereof removed;

FIG. 10 is an enlarged vertical cross-sectional view of the apparatus of FIG. 9.

DESCRIPTION OF THE INVENTION

Figures 3, 4:
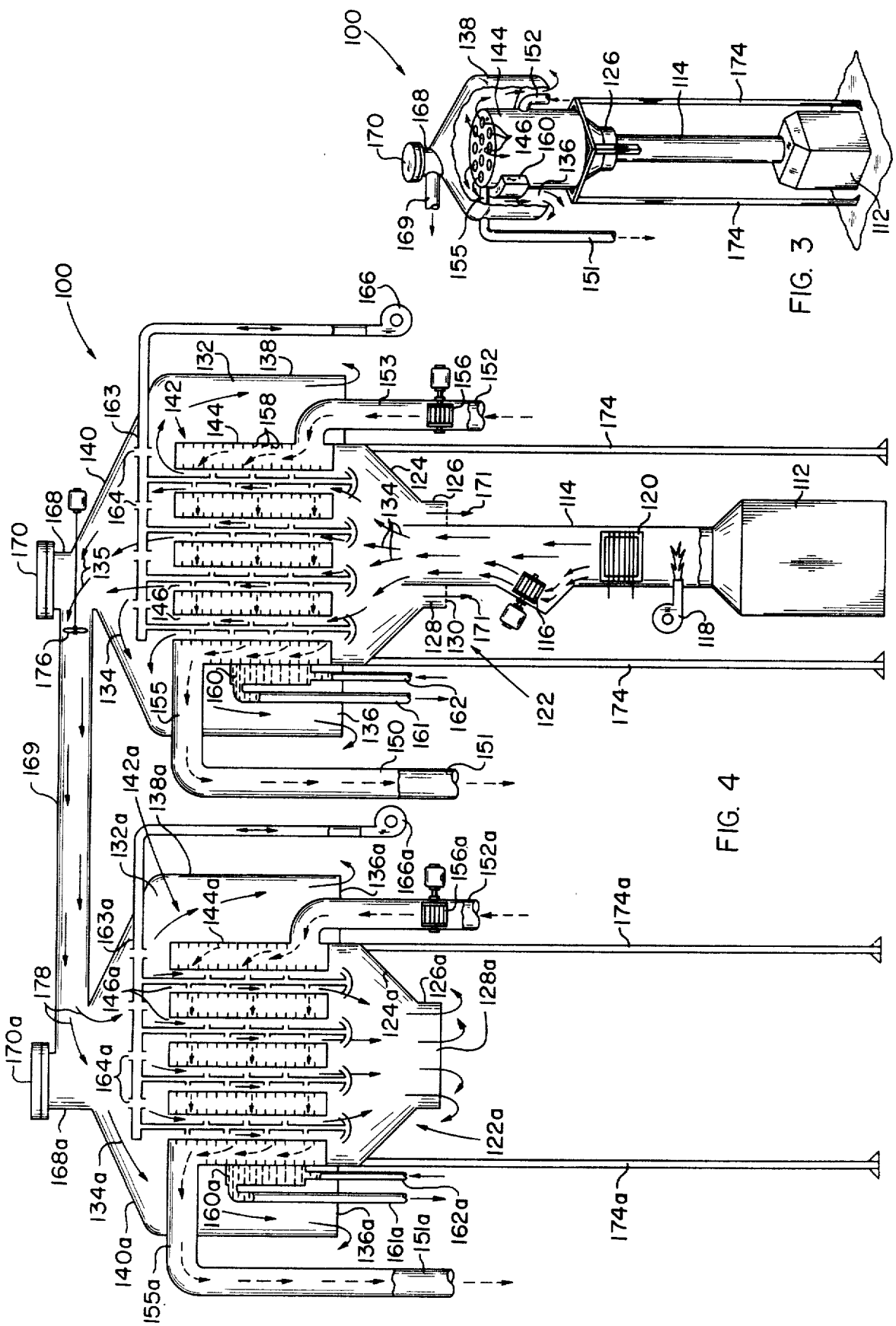
FIG. 3 is a perspective view of part of a modified apparatus according to the teaching of the invention with parts thereof removed.
FIG. 4 is an enlarged vertical cross-sectional view taken through the whole of the apparatus partially shown in FIG. 3.

Referring now to the drawings and more particularly to FIGS. 1 and 2 thereof, the apparatus thereshown is generally identified by the numeral 10. Illustrated as part of the apparatus 10 is a burning source generally identified by numeral 12 that may be any type of firebox that produces hot waste gases. Since the present invention is intended to utilize hot waste gases without regard as to the nature of the source producing the same, the illustration of the source 12 is not intended to limit the scope of the invention. It is anticipated that the source 12 may be anything from a large incinerator for disposing of huge amounts of garbage or other refuse to a small firebox burning fuels as, but not limited to, gas, oil, wood, coal and the like. The nature of the material burned or the size of the source 12 is but a means by which the hot waste gases are produced and which gases are utilized by the present invention.

Connected with the source 12 is a flue pipe 14 that conducts the waste gases upward and away from the source. By being directed substantially vertical, the hot gases tend to rise rapidly and unimpeded in their upward flow and direction of movement from and out of the source 12. Although hot gases rise rapidly because they are normally lighter than air, their velocity of flow may be enhanced and increased by the addition of booster blowers 16, one of which is shown positioned in the offset in the flue in FIG. 2. To improve the combustion and removal of particles of pollution from the waste gases, additional forms of combustion may be located within the flue and in the path of upward movement of the waste gases. Thus, merely as an example, additional burners as the gas or oil-fired burner 18 and the electrical burner 20 may be interposed within the flue 14.

Located substantially vertically above the source 12 is a substantially circular regularly shaped heat extractor generally identified by the numeral 22 that has a downward sloped wall 24 merging with an angular wall 26 that defines a reverse flow or blow back passage 28 between the wall 26 and the flue 14. The passage 28 is open at its lower end. Although a screen or other grid-type member 30 may be mounted therein to prevent the upward movement and entry of undesired materials through the passage 28 into the heat extractor, in practice, and although not shown in the present drawings, a receptacle may be mounted beneath the screen 30 to catch whatever particles of pollution may fall therethrough and out of the reverse flow passage 28.

The screen 30 also prevents the upward movement of undesired debris, as papers and the like that may be sucked up into the passage 28 with the updraft of the raising waste gases. The heat extractor 22 is adapted to receive the hot waste gases directly from the source 12 by way of the conducting flue 14 without the interposition or diversion of any other interfering structure therebetween. To assure this, the head of the flue pipe 14 is shown as ending or terminating within the heat extractor 22 at a point above the blow back passage 28.

The heat extractor 22 functions as a heat accumulator in which the waste gases, being conducted into it by the flue 14, rise rapidly and expand therein. However, unlike in prior known structures, the heat extractor 22 does not permit nor provide for the direct exhaust of the gases into the atmosphere from the heat extractor. Rather, the hot waste gases are made to flow in a path of movement that causes them to move turbulently and violently within the heat extractor so as to cause the same to come into heat exchanging contact and relation with the defining walls of the extractor and with whatever other heat exchange structures that may be in the flow path of the gases. This is accomplished, at least in part, by permitting, or rather forcing, the waste gases to vent from the heat accumulating extractor only after flowing in a path of movement that is in a downward direction, that is to say, in a direction that is not the normal direction of flow to the atmosphere for hot waste gases, but which is made to be the normal forced flow path of the gases according to the invention.

To better understand this, the heat extractor 22 is provided with a substantially large heat accumulator chamber 32 within which the hot gases rise upward as shown by the arrows 34. As the hot gases move upwardly through the chamber 32, they are prevented from exhaust therefrom because there is no escape or exit from the top of the chamber 32 directly to the atmosphere. Thus, the upward direction of flow and movement of the gases is now violently stopped, changed in direction, and their path of movement is caused to divert downward toward the vent 36 that is provided in the heat extractor to permit the gases to exhaust normally from the chamber 32.

The violent movement of the hot waste gases is encouraged to cause the gases to change in their direction of movement so that they are forced to move turbulently within the chamber 32. During their turbulent movement they tend to lose their heat rapidly to whatever surfaces they come into contact. Thus, as they come into contact with the surfaces of the chamber 32, they release the heat to such surfaces. In addition to releasing their heat to the surfaces of the chamber off which they bounce, they also release their heat within the chamber 32 as the direction of the turbulent flow of gases changes within the chamber.

To encourage this violent change of direction of flow of the gases within the chamber 32, the heat accumulating extractor 22 is provided with the annular vent 36 that encircles and is open at the bottom or lower end of the side wall 38 which completes the enclosing side of the chamber 32. The top wall 40 of the chamber 32 cooperates with the side wall 38 to complete the top of the heat extractor chamber. It should be clear from FIG. 1 that the vent 36 is formed by spacing the connected walls 24 and 26 at the inlet side of the heat extractor 22 from the encircling wall 38.

Fluid containing heat exchanger means are positioned in heat extracting relation with the heat extractor 22 so as to enable the utilization of the accumulated heat and the heat of the waste gases for performing useful work. The heat exchanger means includes a body generally identified by the numeral 42 that includes a chamber 44 enclosed within the chamber 32 of the heat extractor 22. The heat exchange chamber 44 has a plurality of vertically disposed through passages 46 that permit the movement therethrough of the hot waste gases as the same rise through the heat extractor.

The heat exchanger 42 further includes a double walled chamber 48, the one wall 38 of which is common to both the heat extractor 22 and the double walled chamber 48. The other spaced wall 50 of the heat extractor chamber 48 forms the exterior surrounding wall of the apparatus 10. In the present embodiment, the double walled chamber 48 encompasses and encloses the heat extractor chamber 32 thereby forming an enclosing insulating chamber 48 about the same into which heat accumulated in the chamber 32 is transmitted.

In this embodiment the two heat exchange chambers 44 and 48 are shown connected together in the drawing at their inlets by a common fluid supply 52 that is bifurcated to define ducts 53 and 54. The two exchanger chambers are further connected at their outlets by a connecting duct 55, all of which connect with an outlet duct 51. Fluid in the form of clean air, gas or a liquid may be fed into the heat exchanger chambers 44 and 48 under increased flow or boosted pressure by a blower or booster pump 56. Intimate and selective control of fluid to either heat exchanger chamber 44 or 48 may be accomplished by the operation of a valve 57 that may be interposed in each duct, but for convenience is shown only in the duct 54 of FIG. 2. By reason of the separation of the pollution containing heat extractor chamber 32 from the heat exchanger chambers, it is now possible to flow and move a clean fluid through the heat exchanger free of contamination with or by the waste gases that are exhausted into the heat extractor at the flue 14 and that flow therethrough to the atmosphere through the vent 36.

In the present embodiment, the fluid supply 52 may be connected with a recirculating clean air or clean water system. When the supplied fluid is moved through the heat exchanger of the apparatus 10, it becomes heated without being contaminated. Thereafter, it may be circulated to provide hot air or hot water for commercial or domestic room heating or drinking purposes, or for any other desired use. Because the fluid flowed through the heat exchanger and more specifically the chambers 44 and 48 thereof is uncontaminated by the waste gases, it should be clear that the same may be used for any purpose in the same manner as clean air or clean water is presently capable of use, even including the use for operating a turbine, generator or the like.

The heat exchanging fins 58 illustrated in FIG. 2 aid in the transfer of heat. Although the heat exchanger chambers 44 and 48 are shown connected together and supplied from a common source of fluid, it will be apparent to those who are skilled in the art that the same could be separated and that each of the ducts 53 and 54 may be supplied from separate sources of different types of fluid.

Additional heat may be absorbed from the waste gases for generating steam or hot water by mounting a jacket 60 within the heat extractor 42. The jacket 60 may be connected with a circulating water or other liquid supply at the pipes 61 and 62. If desired, the jacket 60 may be conveniently mounted in heat exchange relation with an exposed wall of the heat exchanger chamber 44 as is illustrated in FIGS. 1 and 2. In this way the liquid passing through the jacket 60 is in heat exchange relation with the wall of the heat exchange chamber 44 and also is heated by the hot waste gases flowing thereabout in the heat accumulator extractor chamber 32 prior to their exit to the atmosphere through the vent 36.

Although attempts have been made to eliminate from the hot waste gases the particles of pollution, it is found in practice that the waste gases flowing into the apparatus 10 from the source 12 and at the flue 14 contain some particles of pollution that may tend to adhere to and accumulate on the surfaces of the heat extractor and also within the passages 46. When these particles of pollution accumulate in sufficient amount, they tend to close the passages through which they flow. Therefore, it is important to be able to keep such passages open for full volume of flow of the waste gases therethrough.

Incorporated into the present apparatus is a means for removing whatever particles of pollution may accumulate on the surfaces, either of the heat extractor 22 or the heat exchanger. To this end there is incorporated into the heat extractor 32 a system for cleaning the same. As illustrated in FIG. 2, a series of pipes 63 having nozzles 64 are targetted at strategic areas of the passages 46 and at surfaces of the chamber 32.

The piping system 63 is connected with a pump 66. The pump 66 has the capability of operating both in a suction and a pressure mode. When the pump 66 is operated in its suction or vacuuming mode, the system functions as a vacuum cleaner to remove and clean the surfaces and areas at which the nozzles 64 are targetted. When, at times, the particles of pollution cling stubbornly to the surfaces that are to be cleaned such that vacuuming alone is not sufficient to dislodge them, then the pump 66 may be operated in its pressure mode to apply jets of pressurized air against the targetted surfaces to dislodge the stubborn or clinging particles.

After such particles are dislodged, they will then flow with the hot waste gases toward the exhaust 36 and toward the atmosphere. A receptacle (not shown) positioned beneath the vent 36 will catch whatever particles of pollution fall from the hot waste gases as the same flow downward into the atmosphere at the exhaust vent 36. If desirable, after the pump 66 is operated in its pressure mode to dislodge particles of pollution free of the surfaces to which they cling, the pump may then be switched to its vacuuming or suction mode to withdraw through the vacuum system whatever particles of pollution remain within the heat extractor.

In operation, the hot waste gases produced at the source 12 tend to rise rapidly along the flue 14, by reason of their lighter weight, to exit therefrom at the head of the flue into the lower portion of the heat extractor 22. The flue gases move in the direction of the arrows 34 and flow upwardly rapidly through the passages 46 provided within the heat exchanger chamber 44. During their flow though the passages 46, the hot gases release their heat to the surfaces of the passages to heat the interior of the chamber 44.

This heat is transmitted more readily and more quickly by the radiating fins 58 contained within the chamber 44. Thus, any fluid flowing through the chamber 44 becomes quickly heated. The upward flow of the hot waste gases from the source 12 and through the flue 14 is enhanced by the increased pressure of the blower 16. This, in combination with the normal tendency of the hot gases to rise, causes the high velocity gases to bounce off of the common wall 40 of both the heat extractor and the double walled heat exchanger chamber 48, thereby imparting and releasing to such wall and to the heat exchanger chamber the heat of the waste gases.

Because there is no vertical exit to the atmosphere for the hot waste gases as they rise through the heat extractor 22, and strike the wall 40, they must now rapidly reverse their direction and flow downward if they are to exhaust to the atmosphere at the exit 36 from the heat extractor chamber 32. As noted previously because of the violent change in the direction of flow of the hot waste gases and their high velocity of movement, turbulence is created within the gases causing the gases to release their heat more rapidly against the surfaces into which they come into bouncing contact and within the heat accumulator extractor chamber itself. Eventually, as the waste gases lose much of their heat, they find their way downward to the exhaust vent 36 through which they exit to the atmosphere.

Provided within the heat extractor chamber 32 is an emergency exhaust duct 68 positioned at the topmost portion thereof. The exhaust duct 68 is normally closed by a cap or cover at 70. In the event of an emergency, or should there be a need to repair an interior portion of the apparatus 10 by reason of a failure of any portion of the structure thereof, the exhaust duct 68 is sufficiently large to permit entry into the interior of the apparatus 10 for this purpose. In addition if it should become necessary, in an emergency, to provide for an exhaust of the hot waste gases directly into the atmosphere rather than along the tortuous downward path as required to be performed in order to exit from the heat extractor chamber 32 at the exhaust vent 36 thereof, the closure cap 70 may be removed from the exhaust duct 68 for this purpose.

If, for any reason, the passages 46 or any other portion of the heat extractor 22 should be closed by the accumulation of particles of pollution therein that are not capable of being removed or dislodged through the vacuuming system 63, then there will be a possibility of a blow back or reverse flow in the direction of the hot waste gases. That is to say, if the pressure build-up anywhere within the heat extractor 32 is greater than that of the pressure of the hot waste gases entering the heat extractor at the head of the flue 14, then there will be what is commonly known as a blow back condition.

In this blow back condition, or reverse flow, the hot waste gases entering into the heat extractor 22 at the head of the flue 14 will be incapable of flowing fully through the heat extractor and outward therefrom to the atmosphere by way of the vent 36. Under such conditions an exit is provided for the hot waste gases to exhaust from the heat extractor by way of the reverse flow or blow back passage 28. Upon the occurrence of such blow back condition, the waste gases entering the heat extractor by way of the flue 14 will flow downwardly through the passage 28, the screen 30, and into the atmosphere in the direction of the arrows 71.

Thus, the blow back passage 28 permits the exhaust of the hot waste gases from the heat extractor 22 before such gases pass through the heat extractor upon the occurrence of a blow back condition. The emergency exhaust duct 68 will also permit the emergency exhaust of the hot waste gases after the same have flowed or moved only partially through the heat extractor while the exit vent 36 will permit the downward flow and movement of the hot waste gases from the heat extractor after the gases have moved completely through the heat extractor. In the event of a blow back condition as described above, the hot waste gases exiting from the heat extractor in the direction of the arrows 71 and through the screen 30 may be forced to flow into or through a receptacle position therebeneath, but not shown in the illustration. Such receptacle will catch whatever particles of pollution are entrained within the hot waste gases flowing through the screen.

Referring now to the embodiment of the invention illustrated in FIGS. 3 and 4, the apparatus thereshown is generally identified by the numeral 100. Because the apparatus 100 is substantially like that of the previously described apparatus 10, parts of the apparatus 100 corresponding to those of the apparatus 10 will be numbered with the same 10's digits, but in the 100 series. To avoid a duplication of description, only the differences between the present apparatus 100 from that already described with respect to the apparatus 10 will be referred to hereinafter with the understanding that the parts in common between the two apparatuses require no further description as to construction or function.

The apparatus 100, like the apparatus 10, may be supported above the source of hot waste gases 112 by standards 174. The difference between the present apparatus 100 and that of the apparatus 10 resides in the absence from the present apparatus of the heat exchanger chamber 48 which, in the apparatus 10, insulatingly encompasses and encloses the heat extractor 22.

The present apparatus 100 teaches the ability to utilize the waste gases emanating from the source 112 to their fullest extent. That is to say, if there are sufficient hot waste gases, and if the heat of the waste gases is greater than that capable of being extracted and used in the chamber 132 alone, it is possible to direct a portion of the waste gases to one or more substantially duplicate modules of the apparatus 100 by positioning the same in tandem, one along the side of the other as shown in FIG. 4. Such multiplication and addition of like modules of chambers 132 and 144 may be accomplished in any convenient manner as illustrated in FIG. 4.

For example, as many duplicate modules of the heat extractor and heat exchanger may be added to the apparatus 100 as may be needed to utilize the benefits of the hot waste gases produced at the source 112. In the illustration of FIG. 4 only one additional module has been shown to be added to that already described. It is believed that a description of this additional module would suffice for a clear understanding that if additional modules were also added, the same would be added in the same manner as the one shown in FIG. 4. The essential details of the added module are identified with the letter "a".

The accommodation and adaptation of such additional modules to the basic structure is accomplished by adding a conducting flue 169 to the already existing emergency exhaust 168 as shown in FIG. 4. The flue 169 connects with the additional module at the point 168a thereof below the normally closed but openable cover 170a to direct into the top of the heat extractor 122a those hot waste gases that rise into the emergency exhaust 168. Since the annular vent 136 of the heat extractor 122 remains open, some of the hot waste gases will flow in the direction of the arrows 134 after passing through the passages 146 of the heat exchanger 142.

Those gases that do not flow downward as in the direction of the arrows 134 to exhaust in a downward flow into the atmosphere from the annular vent 136, will flow upward in the direction of the arrows 135 to flow into the flue 169 that connects with the heat extractor 122a. This lateral flow may be increased by a suitable fan or blower 176 positioned within the conductor 169. As the hot waste gases enter the heat extractor 122, they flow in a direction downward, aided by the draft created at the annular exhaust vent 136a and by the pressure of the blower 176. The downward flowing hot waste gases tend to escape to the atmosphere through the annular exhaust vent 136a and through the narrowed opening 128a beneath the heat exchanger body 142a.

Thus, the waste gases will come into heat exchanging contact with the surfaces of the heat exchanger chamber 144a. During such contact the hot waste gases continue to release their heat to the surfaces of the chamber 144a and to the fluid that is flowing therethrough. If desired, a water jacket 160a and circulating pipes 161a and 162a may be added to enable the transfer of heat to a liquid therein.

A closed system of circulating fluid is supplied to the heat exchanger 142a much in the manner as previously described at the supply 152a. This fluid is circulated at the duct 151a in the same manner as previously described. Those skilled in the art will recognize that the additional module or modules added to the basic apparatus 100 are essentially the same as the previously described apparatus. The only difference is that the source 112 and its flue 114 have been omitted from the additional module. The reason for this is because the excess hot waste gases produced by such source are more than the first module is capable of absorbing and exchanging. Hence, the excess of the hot waste gases produced by the source is diverted for use by the additional module or modules.

The additional module or modules should be positioned substantially level with the basic module with which the source 112 is connected. This will locate the vents 136 and 136a at substantially the same height or level. It will similarly position the blow back or reverse flow passage 128 with the new passage 128a.

By the equal levelling of the vents and passage outlets, the gases, seeking their own levels of exhaust to the atmosphere, will exhaust substantially equal from each such module. If the atmosphere vents of one module are higher or lower than the other module, the gases will seek to vent to the atmosphere more rapidly from the higher positioned vents. Although in practice it is desirable to position all vents at substantially the same level, the vents of one of the modules may be raised or lowered with respect to those of the other to obtain desired flow effects of the gases through each of the modules. Thus, it is possible by proper positioning of the vents of the various modules the gases will be caused to flow more through one of the modules than through the other.

Because of the similarity of the embodiments 10 and 100, it should be apparent to those who are skilled in the art that the application of a plurality or a multiple of modules of the heat extractor and heat exchanger may be added to the apparatus 10 as illustrated in FIGS. 1 and 2 in the same manner as is taught by the construction described with respect to the apparatus 100 of FIGS. 3 and 4. The differences between the two apparatuses do not in any way negate the possibility of providing for a plurality of such modules along with their respective structures and attendant functions.

Figures 5, 6:
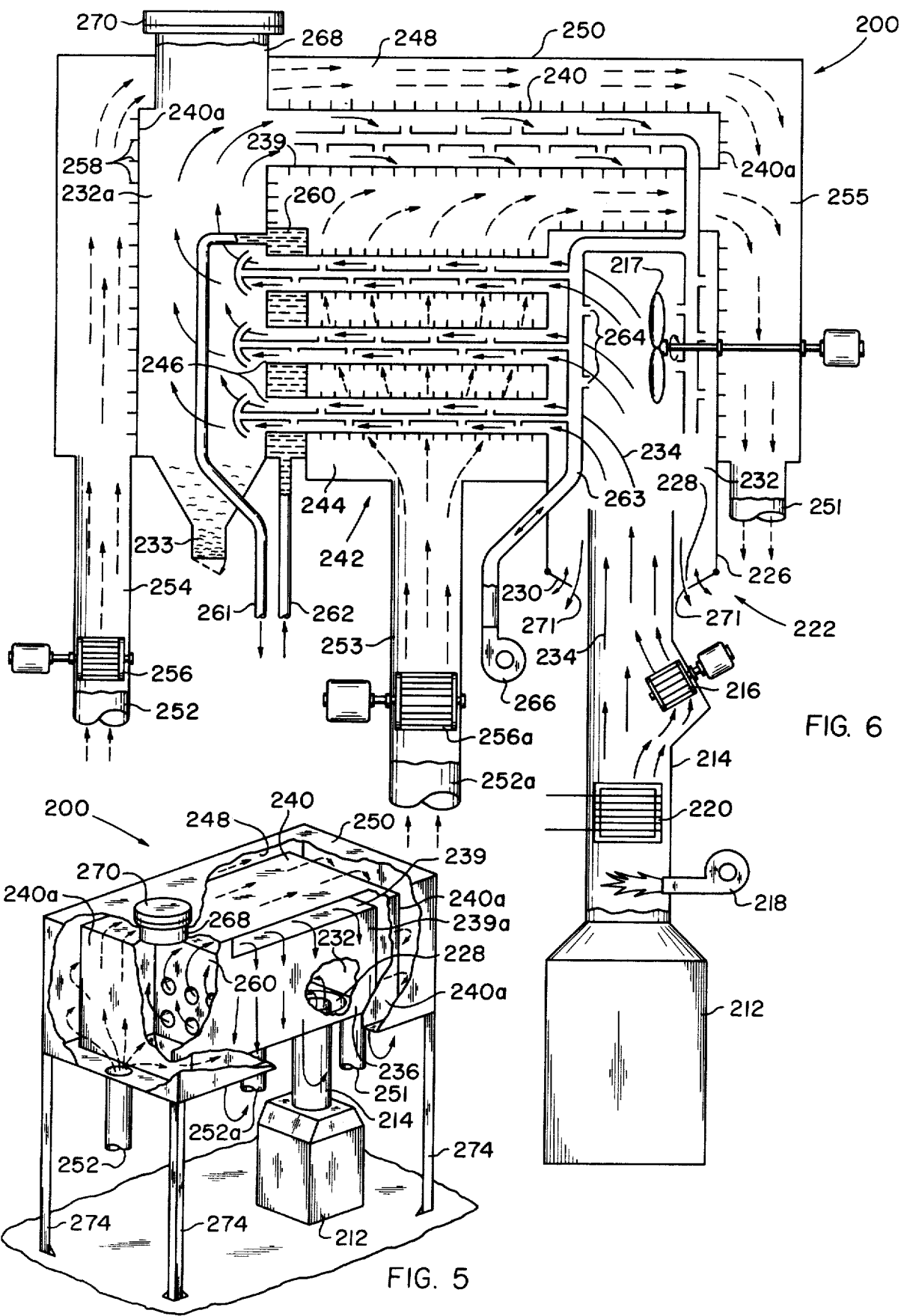
FIG. 5 is a perspective view of another embodiment of the apparatus constructed according to the invention with parts thereof removed.
FIG. 6 is an enlarged vertical cross-sectional view taken through the apparatus of FIG. 5.

Referring now to the embodiment illustrated in FIGS. 5 and 6, the apparatus thereshown is generally identified in the 200 series of numbers with the 10's digits thereof identifying details corresponding to those identified with respect to the description of the apparatus 10 and other embodiments. The apparatus 200 teaches the ability to rearrange the details of the apparatus 10 in rectangular or substantially rectangular configuration rather than in the circular or annular configuration as taught by the apparatus 10. In so doing, the directions of flow and other features previously discussed with respect to the apparatus 10 should become more apparent as this description proceeds. For the sake of brevity, a description of like parts of the present apparatus and their functions will be omitted where the same perform and are constructed substantially in the same manner as those of the apparatus 10.

The present apparatus 200, rather than extending vertically in the manner of the apparatus 10 or 100 previously described, may be constructed in a lower, horizontal profile extending over a larger area. Thus, the apparatus 200 may be conveniently mounted on the roof of a building that may have a large supporting surface for the same or extended over a corresponding ground surface.

The apparatus 200 supplies the hot waste gases from the source 212 to exhaust the same at the head of the flue 214 directly into the chamber 232 of the heat accumulator extractor 222. The hot waste gases tend to rise rapidly by reason of their lighter weight and are caused to abruptly divert in their upward path to enter into the through passages 246 provided in the heat exchanger 242, and more particularly extending completely therethrough, but closed to the interior chamber 244 of the heat exchanger.

As the hot gases flow through the heat accumulator chamber 232 and passages 246, they release a part of their heat to the surfaces thereof and exit therefrom into a continuation 232a of the heat accumulator extractor chamber. The normal tendency of the waste gases would be to flow upward within the chamber 232a and directly outward to the atmosphere from the apparatus 200 by way of the emergency exhaust 268 that is closed by the closure 270; but because of the interposition of the closure 270, the waste gases are caused to change the direction of their flow violently and to turbulate within the heat accumulator chamber 232, 232a to flow upward fully around the top surface 239 and then downward along the side surfaces 239a respectively to transfer their heat thereto. The now cooler waste gases exit from the interior of the heat accumulator extractor chamber in a downward flow path at the vent 236 formed between the walls 239a and 240 as seen more clearly in FIG. 5.

Thus, as in the previously described embodiments, the turbulent and tortuous path along which the waste gases must flow causes the same to release their heat within the portions of the heat accumulator extractor chamber 232, 232a and to the walls against which the gases strike and bounce during the continuation of their movement toward their exit by way of the vent 236. The velocity of flow of the hot waste gases is boosted or increased by the use of the booster 216 and may be enhanced further in their horizontal flow through the horizontally arranged passages 246 by the booster fan 217. When the waste gases reach their flow position between the walls 239 and 240, their direction of movement once again changes as the gases flow downward and outward to the atmosphere by way of the exhaust 236.

As in the embodiment of the apparatus 10, the present apparatus 200 includes a double walled heat exchanger chamber 248 that is shown in FIG. 5 that completely encircles the top, the two longer sides and the ends of the heat extractor 222. This complete encirclement of the heat extractor insulates the heat extractor and also completely absorbs therefrom whatever heat is released by the hot waste gases during their turbulent flow through the heat extractor chamber 232, 232a. Advantageous use is made of the outer encompassing heat exchanger chamber 248 by providing to it at one end 252 thereof with a clean fluid supply as water, clean air or the like.

A booster 256 placed within the duct 254 increases the pressurized flow of the fluid through the vertical space of the chamber 248 and that becomes heated therein more rapidly by the radiating fins 258. The supplied fluid flows over the top common wall 240 that the chamber 248 has with the heat extractor 222, and between the wall 240 and an outer or exterior wall 250. The clean fluid then flows downwardly along the sides of the sidewalls and end wall 240a to complete its path of circulation by way of the duct 255 to the outlet 251.

In the present embodiment 200, a second separate supply of clean fluid as air, gas, water or the like may be supplied to the heat exchanger chamber 244 by way of a duct 253 that may receive its supply from a separate source 252a and that may be placed under increased velocity and flow pressure by a booster 256a. The flow path of the fluid of the duct 253 passes about the surfaces of the passageways 246 and flows into merger with the flow path of the fluid entering between the double walled heat exchange chamber 248 by way of the connecting duct 255. There both fluids merge and exit in their circulating path by way of the outlet duct 251. In practice, it is foreseeable that the clean fluid moving through the chamber 248 may be circulated through and along a path that is separate from that of the fluid moving through the heat exchanger chamber 244. Thus, rather than merging both paths with each other at the duct 255 as shown, the same may be recirculated in their separate and individual flow paths.

As in the prior embodiment 10, a cleaning system containing a piping system 263 having strategically located nozzles 264 operated by a pump or blower 266 may be utilized to keep clean the interior of the apparatus. Also as described with respect to the embodiments 10 and 100, the emergency exhaust 268 normally is closed by the closure 270. However, if desired, the closure may be removed and additional modules of the apparatus 200 as already described may be mounted in position thereabove to receive the benefits of the hot waste gases should such gases produce heat greater than that capable of being absorbed and exchanged within the apparatus 200 here disclosed. In addition, the emergency exhaust 268 may provide an intermediate outlet to the atmosphere in the event a problem should occur with the apparatus downstream of the location of such emergency exhaust.

In the event of a pressure build up in the apparatus in an amount that is greater than that of the pressure at the head of the flue 214, the heat extractor chamber 232 is provided with a blow back or reverse flow passage 228. The passage 228 may have provided thereabout a pivotable closure valve 230 which, when the pressure within the passage is sufficiently great, will cause the valve to pivot open in the manner such as shown by the arrows 271 to permit the reverse downward and outward flow of the gases so as to enable the same to exhaust immediately from the heat extractor chamber 232 without doing damage to the interior of the chamber or the apparatus 200.

At times, particles of pollution may tend to accumulate within the heat extractor chamber that the vacuum system may not fully accommodate or clean therefrom. For this reason, the heat accumulator portion 232a may be provided with a downward sloped receptacle 233 into which the particles of pollution will accumulate and that may be cleaned from time to time by dumping the same into a refuse receptacle not shown.

In the same manner as discussed with respect to the apparatus 10, a water jacket 260 may be mounted about and in heat exchange relation with the heat exchanger chamber 244 and within the flow path of the hot waste gases to thereby cause the liquid therein to heat and, at times, depending upon the heat to which it is subjected, turn to steam. The steam may be vented by way of the exit pipe 261 into a circulating system that is connected with the inlet pipe 262.

In the embodiment of the apparatus generally identified by the numeral 300 as in FIGS. 7 and 8, parts thereof corresponding to those previously discussed with respect to the prior apparatus embodiments will be identified by like 10's digits. Because of their prior description and their functions, a repetition of the same will be avoided where possible.

The present embodiment 300 relates to an apparatus that is similar to that of the apparatus 200 previously described. The chamber 344 of the heat exchanger 342 is arranged substantially horizontal and perpendicular to the normal flow path of the hot waste gases as they exit from the head of the flue 314 directly into the heat accumulator extractor chamber 332. The chamber 332 includes the passages 332a that enclose and permit the hot waste gases to circulate about the passages 346.

A passage 328 is provided about the flue and between the walls of the heat extractor chamber 332 to permit for the reverse flow of the waste gases from the chamber and to prevent damaging blow back to the apparatus in the event pressure anywhere within the apparatus downstream of the flue head is greater than that of the waste gases entering into the heat extractor chamber 332 from the flue head. Thus, the passage 328 permits the waste gases exiting from the head of the flue to exhaust from the apparatus without damage to the remaining portions of the apparatus. Whatever particles of pollution that may be contained in the reverse flowing gases may be trapped in the receptacle 333 for later disposal.

The present invention differs from that of the prior apparatuses (200) in that the double walled heat exchanger chamber 348 does not extend fully downward about the elongated sides of the heat extractor 322 or of its chamber 332 as it does in the apparatus 200. Rather, in the present apparatus the double walled heat exchange chamber 348 extends only along one side, the top and down about the other side of the heat extractor 322. Emergency exhaust to the atmosphere of the waste gases from the heat extractor 322 at exhaust duct 368 capped at 370 in the manner as was provided in the prior discussed embodiments.

In the present embodiment, the hot waste gases rise from the source 312 and should it be necessary, the booster 316 increases such upward flow. The waste gases enter into the heat extractor 322 at the chamber 332 thereof exiting immediately from the head of the flue 314 and directly upward into such heat extractor chamber. The waste gases are caused to circulate about the passages 346 to release their heat thereto and then divert in their upward path to move in a horizontal direction along the upper portion of the chamber 332. They flow outward from the heat extractor chamber 332 aided, if necessary, by flow increasing boosters or fans (not shown) to flow in a downward path through the vent 336 to exhaust therefrom to the atmosphere.

A double supply of clean fluid may be provided, each for separate portions of the heat exchanger. The supply 352 aided by the booster 356 may supply clean air or other fluid to the double walled heat exchange chamber 348. In the present embodiment the passages 346 have been varied from that of the prior discussed embodiments. The passages 346 are directly connected with the clean fluid supply 352 while the hot waste gases circulate thereabout. Hence, the flow of the fluid is shown by the arrows to flow horizontally in the chamber 348 between and along the outer surrounding wall 350 and inner wall 340, and outward into its recirculating path at the duct 351.

A second flow path of clean fluid, such as air, gas or liquid from the supply 352 moves through the heat exchange chamber 344 and for merging with the first described flow path of fluid by flowing through the passages 346 at the connecting duct 355a. In each instance the heat accumulated in the chamber 332 is transmitted directly to all of the surfaces against which the hot waste gases strike and off which they bounce in their diverted flow during their turbulent movement to exit in a downward direction from the vent 336.

Once again a vacuuming or cleaning system may be provided by the piping 363 and its attendant nozzles 364 and the pump 366. The increased heat exchange is accomplished at the fins 358 in the same manner as previously described. It is to be noted that the present embodiment may be expanded in the same manner as was discussed with respect to the prior apparatuses. That is to say, if the supply of hot gas at the flue 314 is greater than that capable of being absorbed and utilized in the apparatus 300 as shown, a plurality of additional modules of both heat extractor 322 and heat exchange structure 342 with the double walled chamber 348 may be added directly to the present apparatus either directly above the same or to the side thereof simply by connecting such apparatuses along adjacent sidewalls of the adjacent apparatuses much in the manner as will be discussed with the next succeeding apparatus 400.

The embodiment of the apparatus illustrated in FIGS. 9 and 10 is generally identified by the numeral 400. The parts thereof corresponding to previously discussed elements will be numbered with the same 10's digits. Where possible, an attempt will be made to avoid a repetition of the discussion of such elements and their functions, the same having previously been discussed herein.

The apparatus 400 illustrates a low silhouette for utilizing the heat of the waste gases being produced at the source 412 and rising upwardly therefrom through the flue 414 to be dispensed at its heat directly into the heat extractor generally identified by the numeral 422. The heat extractor as illustrated in the present embodiment teaches a method and apparatus that includes a plurality of modules of heat exchanger chambers 444, each one of which may be within the flow path or movement of the hot waste gases.

Provided between the exit or head end of the flue 414 and the heat extractor chamber 432 is a downward depending wall 426 which forms with the head of the flue a reverse flow or blow back passage 428. The present apparatus 400 provides the versatility of being able to use all of the hot waste gases to dissipate the heat and withdraw the same therefrom for the performance of useful work. To accomplish this, the heat extractor chamber 432 is divided into a plurality of right and left parts which are arranged substantially symmetrical about a vertical imaginary line that may be drawn through the flue 414 and the central portion of the heat extractor chamber 432.

Provided substantially at the vertical imaginary line of the dividing central portion of the heat extractor chamber 432 is a diverter vane 433 that is capable of being pivotally operated in an arc automatically and selectively between right and left closing positions 433a and 433b. When the vane 433 is positioned in its solid central position vertically aligned as shown, the hot waste gases being emitted at the head of the flue 414 will travel both to the right and left sides of the heat extractor chamber 432. When the vane is moved either to the right-most position 443a, it will serve to close the flow of gas to the right side of the apparatus 400. Similarly, if it is moved to the left side portion 433b, the gas will be forced to move in the direction of and onto the right portion of the apparatus 400.

Because the hot waste gases tend to rise rapidly and normally upward seeking a short path of exit and exhaust to the atmosphere, the same tend to move upwardly into the emergency exhaust 468. However, by providing closure valves 470 much in the nature of the closure 70 previously discussed with respect to the apparatus 10, and other like apparatuses, the exit for the hot waste gases by way of the emergency exhaust 468 is blocked. As a consequence, the waste gases are caused to change in their path of movement to violently divert into a substantially horizontal flow. Only in the event that it is desired, in case of an emergency, that the waste gases must be diverted and immediately exhausted into the atmosphere will either one or the other of the valves 470 in the lines 468a or 468b respectively be opened to permit the gas to exhaust into the atmosphere therefrom. Otherwise, the valves 470 will be closed in the manner as previously described.

With the vane 433 positioned vertically as illustrated in FIG. 10, the hot waste gases will flow both to the right and to the left thereof. During the flowing movement of the waste gases they will flow through the passages 446 of each of the heat exchange chambers 444. The heat of the waste gases will be exchanged along the surfaces of the chambers 444 to heat whatever fluid is flowing through the chambers. The waste gases will continue their travel to the very end of the covering wall 440 until they reach the end walls 438 that abruptly stop the waste gases in their horizontal movement. This causes the waste gases to move violently and to divert in their flow path to flow in a direction that is downward and opposite to the normal direction of flow of hot waste gases when they seek to exhaust into the atmosphere.

This downward movement and diverted directed flow of the waste gases at the end connecting walls 438 causes the waste gases to turbulate within the heat extractor chamber 432 and fully along the length thereof, thereby causing the waste gases to strike against all of the walls of the heat extractor chamber 432 and against all of the surfaces of the heat exchangers 444 positioned therewithin. This produces a rapid release of heat from the waste gases into the heat extractor chamber 432 in which the heat accumulates and to the surfaces against which the waste gases strike and bounce off. The waste gases ultimately exhaust from the heat extractor outward to the atmosphere in a downwardly directed movement from the vents 436.

To more efficiently utilize the heat of the hot waste gases, each of the heat exchangers 444 may be provided with a separate fluid supply to which each may be respectively connected at the pipe or duct 452. The fluid supply 452, as as previously discussed, may come from a clean air or clean water or other liquid supply, and may be utilized for whatever purpose, either in a recirculating or in a non-recirculating system as is desired. The fluid supply may be increased in its velocity of flow through the respective heat exchanger by the use of a booster pump 456 in the same manner as the hot gases rising from the source 412 may be boosted in velocity by the pump 416, and may be aided in their flow through the heat extractor chamber 432 by fans 417, only one of which is shown in the left-hand side of FIG. 10.

The overall apparatus may be kept clean by the use of the cleaning system including the piping 463 connected with the pump 466 and having the strategically located nozzles 464. Although the apparatus 400 illustrates but a single covering outer wall 440, it should be apparent to those skilled in the art and from a description of the double walled fully encompassing or partially encompassing heat exchanger chambers discussed with respect to the prior embodiments, that the same may also be added to the present invention without varying the scope of the same. That is to say, a double walled heat exchanger chamber equivalent to that of the chamber 48 disclosed with respect to the embodiment 10 of FIGS. 1 and 2 may be applied to the present apparatus without changing its teaching.

As in prior described embodiments, the present embodiment teaches how and the manner in which the apparatus, and prior described similar apparatuses, may be enlarged to include a plurality of heat exchanger chambers 444. The arrangement of multiples of the heat exchanger chambers 444 has been shown in the present apparatus 400 in horizontal placement side by side such that their horizontal passages 446 will receive the horizontal flow of the hot waste gases therethrough. This teaching may be applied with equal facility to the prior disclosed embodiments containing like horizontally positioned heat exchanger chambers.

For ease of explanation the reverse flow or blow back passage 428 of the present embodiment 400 is shown to be free of any screen in the nature of the screen 30 of the embodiment 10 or the movable valve 230 of the embodiment 200. This has been done to enable a fuller understanding of the versatility of the present invention. The reverse flow passage 428 is intended to facilitate the rapid venting of the waste gases from the flue head 414 when there is a build up of pressure within the chamber 432 that is greater than that of the pressure of the hot waste gases being exhausted into the chamber at the head of the flue 414.

It is desirable to protect the passage 428 from the inflow of cooler fluids as gases, liquids and even solid particles that might tend to be lifted upward into the heater extractor chamber 432 by the suction created in the passage by reason of the hot waste gases rising rapidly upward into such chamber. To avoid this possibility, the screen 30 is illustrated as being interposed within the passage 28 in the embodiment 10. In like manner, an operable valve 230 is illustrated for use in the apparatus 200.

Figure 11:
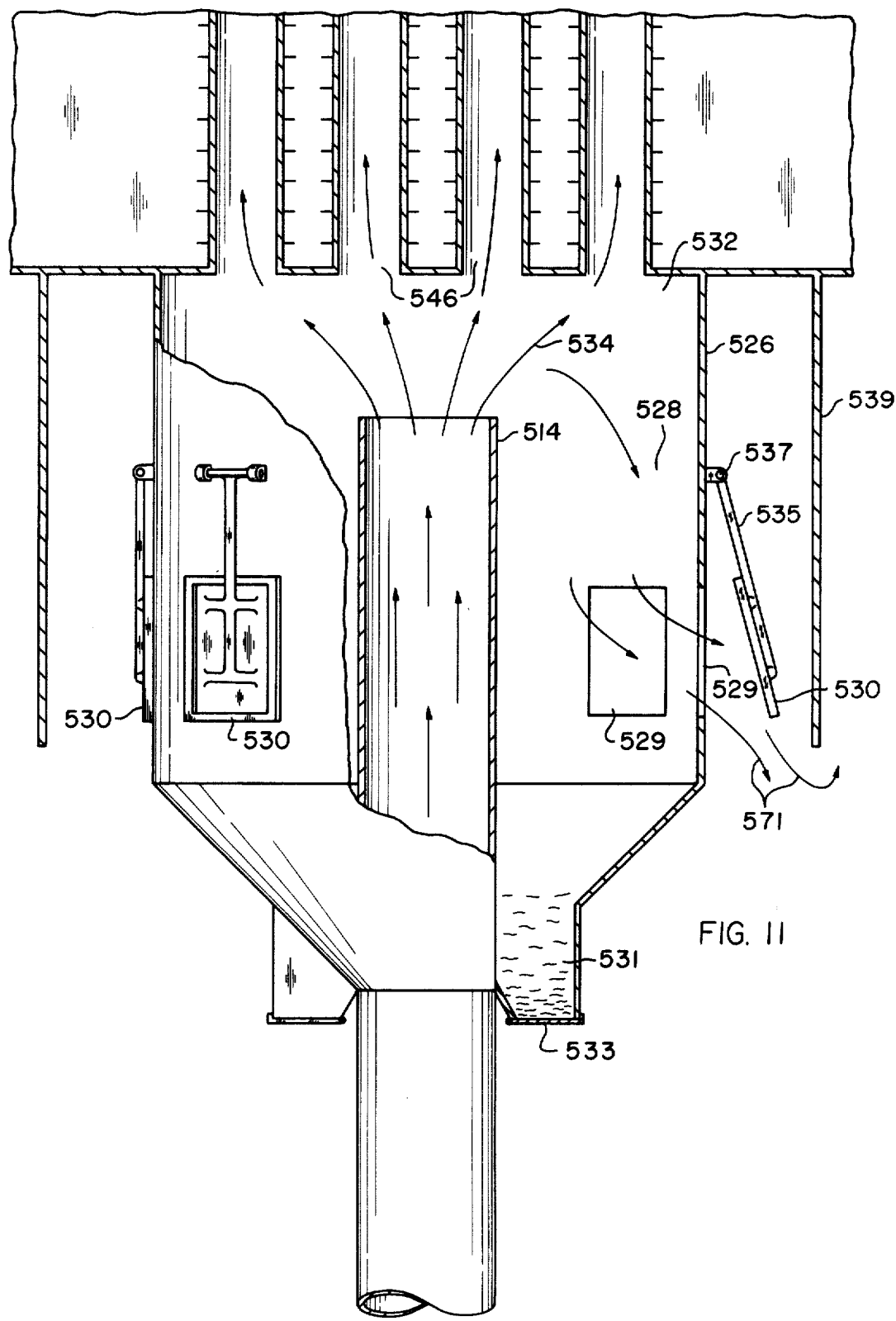
FIG. 11 is a vertical cross-sectional view of a portion of the apparatus showing the reverse flow passage and openings about the flue head according to the teaching of the invention.

Although the screen 30 and the valve 230 there disclosed may be utilized, reference is now had to FIG. 11 wherein an enlarged view of a preferred embodiment of the reverse flow or blow back passage is illustrated with the remaining structure shown only in partial detail. For convenience, the illustration shown in FIG. 11 will be numbered in the 500 series so that the 10's digits thereof may be made to correspond with like elements previously described with respect to the apparatuses hereinbefore discussed, thereby enabling a clearer correlation in the mind of the reader between the present structure and that of the embodiments hereinbefore described.

The wall 526 defines with the flue 514 an annular space which, as in the prior discussed embodiments, forms the reverse flow or blow back passage 528. The wall 526 is extended downward along the head of the flue 514 and is provided with a plurality of exit openings 529 about its periphery. In the present construction, the wall 526 is closed at its lower end about the flue 514 to form a receptacle 531 into which particles of pollution may fall and may be trapped for subsequent disposal through a trap door 533.

Each of the openings 529 of the passage 528 is normally closed by a valve 530 that is mounted on an arm 535 pivotally mounted at 537. The weight of the valve member 530 and the arm 535 is such that the same tends normally to fall into closing relation against and over the defines of its respective exit opening 529. However, the weight of the valve and its arm is not so great as to prevent its displacement to its open position as is shown at the right side of FIG. 11 in the event there is a downward flow of hot waste gases to displace the same into its open position.

Thus, the valve 530 is normally closed, but will respond to a blow back or reverse flow of pressure in the passage 528 to enable itself to be displaced into its open position, as shown, to permit the exhaust of the hot waste gases outwardly from the heat extractor chamber 532. The valves also prevent the reverse flow of colder atmospheric air into the chamber 532 to dilute the heat of the waste gases. Circumposed about the wall 526 is an additional wall 539 that functions as a wind barrier and protector to enclose the valves 530 and protect them from wind blasts that might tend to resist the opening of the valves in response to a blow back condition. The wall 537 further protects the surrounding atmosphere from a strong flow of hot waste gases outward from the openings 529 in the event a blow back condition should occur.

From what has been discussed, it should be apparent that the apparatus of FIG. 11 could be adapted for use with any of the prior discussed embodiments. For this reason, it has been shown in a separate illustration to enable a clearer understanding of its details. Its manner of application to the prior embodiments is believed apparent to those skilled in the art.

Each of the embodiments show the respective exhaust paths of the hot flue gases to be by way of the vents 36, 136, 236, 336 and 436. It is the intention that trapping receptacles be positioned beneath such vents to receive waste particles of pollution that will fall thereinto. The receptacles 233 and 333 are exemplary of the same. Such receptacles have not been illustrated since to do so will encumber and confuse the illustrations. It is believed their placement and use should be apparent to those skilled in the art in light of the illustrations in FIGS. 6 and 8 and their related descriptions.

While there have been shown and described and pointed out the fundamental novel features of the invention as applied to plural embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. An apparatus for utilizing waste gases comprising a source in which waste gases are produced,
heat extractor means for extracting heat from the waste gases,
a clean air chamber through which clean air is flowed,
flue means for conducting the hot waste gases to cause the same to flow from the head of said flue means directly from said source into said heat extractor means,
said heat extractor means including means to direct the hot waste gases to pass therethrough in heat exchange relation with said clean air chamber to heat the clean air flowing through said clean air chamber and thereafter to exhaust said waste gases normally from said heat extractor means to the atmosphere in a downward direction of flow,
and a flow passage means providing an opening to the atmosphere and through which the waste gases flow from said apparatus to the atmosphere from between said flue means and said heat extractor means when pressure in said heat extractor means exceeds the pressure of the hot waste gases from said flue means.

2. An apparatus as in claim 1,
said flow passage being a reverse flow passage between said waste gas flue means and said heat extractor means,
said reverse flow passage having an opening to the atmosphere through which the hot waste gases reverse their direction of upward flow to flow downward into the atmosphere in the event pressure in said heat extractor means is greater than the pressure of the hot waste gases flowing upward from said flue means into said heat extractor means.

3. An apparatus as in claim 1,
valve means closing said opening and operable in response to the greater atmospheric pressure at the exhaust of said hot waste gases to the atmosphere to open said valve means.

4. An apparatus as in claim 2,
means in said reverse flow passage to collect particles of pollution of the waste gases in said reverse flow passage.

5. An apparatus as in claim 1,
said clean air chamber being said heat extractor means.

6. An apparatus as in claim 5,
said clean air chamber enclosing at least a part of said heat extractor means and having a wall in common therewith.

7. An apparatus as in claim 1,
a liquid containing chamber in said heat extractor means through which a liquid flows and is heated by the heat of the waste gases in said heat extractor means and having a wall in common with said clean air chamber.

8. An apparatus as in claim 1,
means in said waste gas flue means to increase the flow of hot waste gases from said source to said heat extractor means.

9. An apparatus as in claim 8,
means in said heat extractor means to increase the flow of the waste gases therethrough and for exhaust into the atmosphere therefrom.

10. An apparatus as in claim 9,
means in said clean air chamber to increase the flow of air through said chamber.

11. An apparatus as in claim 1,
a plurality of connected heat extractor means for the flow of the hot waste gases therethrough.

12. An apparatus as in claim 11,
a plurality of said clean air chambers in said heat extractor means and passages in said heat extractor means for the flow of the hot waste gases therethrough to heat the air in said clean air chambers.

13. An apparatus as in claim 12,
and pressure means connected with said heat extractor means to clean the same.

14. In an apparatus for utilizing hot waste gases,
a source producing the hot waste gases,
means into which the hot waste gases flow and accumulate and from which the heat of such hot waste gases is released,
a flue connected with said source and conducting the hot waste gases from said source to exhaust the hot waste gases from the end of said flue directly into said accumulator means,
and the exhaust end of said flue terminating within said accumulator means such that said flue and accumulator means are relatively spaced to form a passage for the flow of gases therebetween.

15. In an apparatus as in claim 14,
said accumulator means being positioned above said source,
and the end of said flue terminating in said accumulator means to release the hot waste gases directly into said accumulator means from said source and being spaced from said accumulator means to provide said space through which the hot waste gases may exhaust therefrom to the atmosphere.

16. In an apparatus as in claim 15,
said accumulator means having means providing an exhaust path to the atmosphere for the hot waste gases,
clean fluid containing heat exchange means in heat exchange relation with the hot waste gases flowing through said accumulator means so that the clean fluid is heated by the heat of the hot waste gases before the hot waste gases exhaust into the atmosphere from the accumulator means.

17. In an apparatus as in claim 16,
said accumulator means exhaust means directing the hot waste gases in a downward direction of flow to transfer the heat of the hot waste gases to at least a part of said heat exchanger before exhausting the hot waste gases into the atmosphere.

18. In an apparatus as in claim 16,
said heat exchanger being within said accumulator means for the flow of the hot waste gases thereabout.

19. In an apparatus as in claim 18, said heat exchanger having passages for the flow of the hot waste gases therethrough before the hot waste gases are exhausted to the atmosphere from said accumulator means.

20. In an apparatus as in claim 16,
said heat exchanger being within said accumulator means and also enclosing at least a part of said accumulator means in heat exchange relation and including passages for the flow of the hot waste gases therethrough before said hot waste gases are exhausted to the atmosphere from said accumulator means.

21. In an apparatus as in claim 20,
said heat exchanger having passages for the flow of clean fluid therethrough and for the flow of the hot waste gases therethrough before the hot waste gases are exhausted to the atmosphere from said accumulator means.

22. In an apparatus as in claim 14,
the end of said flue remote from said source terminating in said accumulator means,
said space being a passage between said flue and accumulator means for the reverse downward flow of the hot waste gases therebetween to the atmosphere.

23. In an apparatus as in claim 22,
said passage being open at the bottom thereof such that the reverse flow of the hot waste gases passes therethrough to the atmosphere.

24. In an apparatus as in claim 22,
said passage being closed about said flue and having normally closed valved openings therein such that the force of a backward pressure applied to said hot waste gases in said accumulator means forces said hot waste gases downward in said passage to open said normally closed valved openings to enable the hot waste gases to flow therethrough to the atmosphere.

25. In the method of utilizing hot waste gases produced from a burning source,
directing the flow of the hot waste gases in an upward path along a conductor that connects the burning source with a heat accumulator such that the hot waste gases are exhausted into the heat accumulator from the end of the conductor free of the interposition of heat extraction means in or interference with the flow path of the hot waste gases,
and exhausting the flow of the hot waste gases from between the heat accumulator and the conductor when the pressure in the heat accumulator is greater than that of the pressure of the flow of hot waste gases exhausted into the heat accumulator.

26. In the method of claim 25,
diverting the flow of the hot waste gases to slow their movement in the heat accumulator by causing the same to flow in a path downward within the heat accumulator before exhausting the hot waste gases into the atmosphere.

27. In the method as in claim 26,
extracting heat from the hot waste gases during their movement in the heat accumulator to heat a fluid in a heat exchanger within the heat accumulator by directing the flow of the hot waste gases about and through the heat exchanger.

28. In the method as in claim 27,
extracting heat from the hot waste gases moving through the heat accumulator along walls common to the heat exchanger and accumulator before the hot waste gases exhaust from the heat accumulator into the atmosphere.

29. In the method as in claim 28, trapping heat of the hot waste gases in the heat accumulator by enclosing at least a part of the heat accumulator with a heat exchanger through which a fluid is flowed.

30. In an apparatus for utilizing the heat of hot waste gases produced at a source, heat extractor means above said source to receive the hot waste gases directly therefrom and to extract heat from the hot waste gases, heat exchanger means, said heat exchanger means and heat extractor means having a wall in common, means conducting the hot waste gases from said source to cause the same to flow into said heat extractor means where the heat from the hot waste gases is extracted and accumulated and said common wall is heated by the hot waste gases, and a pressure release passage between said source conducting means and heat extracting means to exhaust the hot waste gases from flow through said heat extractor means when the pressure in said heat extractor means is greater than that of the hot waste gases flowing from said conducting means.

31. In an apparatus as in claim 30, said heat extractor means having exhaust means to direct the flow of the hot waste gases in a downward direction after the hot waste gases have flowed through said heat extractor means to exhaust such hot waste gases into the atmosphere, and means supplying a fluid to said heat exchanger means so that the fluid is heated by said hot waste gases passing through said heat extractor means.

32. In an apparatus as in claim 31 said heat exchanger means entrapping the heat of the hot waste gases in said heat extractor means such that the fluid supplied to said heat exchanger means is heated at said common wall.

33. In an apparatus as in claim 32, said heat exchanger means including at least a chamber within said heat extractor means through which the supplied fluid flows.

34. In an apparatus as in claim 33, said heat exchanger means including a plurality of said chambers each in heat exchange relation with the hot waste gases passing through said heat extractor means.

35. In an apparatus as in claim 32, said heat exchange means including a double walled passage to which the heat of said common wall is transmitted and through which the supplied fluid flows to be heated therein.

36. An apparatus for utilizing hot waste gases comprising a source of hot waste gases, a heat extractor having a chamber through which the hot waste gases flow and in which the heat is extracted from the hot waste gases and in which the heat is accumulated, flue means connected with said source and having its head terminating in said heat extractor for supplying the hot waste gases directly from said source to said heat extractor prior to the exhaust of said hot waste gases to the atmosphere, heat exchanger means in said heat extractor and through which a fluid is moved to be heated by the hot waste gases in said heat extractor, and vent means including a reverse flow passage to permit the hot waste gases to exhaust from said flue means and heat extractor after the hot waste gases are supplied from said flue means to said heat extractor and before the hot waste gases have moved through said heat extractor when the pressure in said heat extractor is greater than the pressure of the hot waste gases supplied to it.

37. An apparatus as in claim 36, said heat exchanger having passages through which the hot waste gases move during their movement through said heat extractor.

38. An apparatus as in claim 37, said passages being directed substantially horizontal.

39. An apparatus as in claim 38, said passages being directed substantially vertical.

40. An apparatus as in claim 36, plural ones of said heat exchanger in said heat extractor chamber.

41. An apparatus as in claim 36, including a plurality of said heat extractor chambers to which the hot waste gases are supplied, and heat exchange means in each of said plurality of heat extractor chambers.

42. An apparatus as in claim 36, said heat exchange means including a double walled passage external of said heat extractor chamber and at least one of the walls of which is common to at least one of the walls of said heat extractor chamber and through which a fluid moves to be heated by said hot waste gases in said heat extractor chamber.

43. An apparatus as in claim 42, said double walled passage enclosing at least a part of said heat extractor chamber.

44. An apparatus as in claim 43, said heat extractor chamber being of substantially regular shape, and said double walled passage enclosing at least the top and at least a side thereof.

45. An apparatus as in claim 42, said heat extractor chamber being substantially rectangular and said double walled passage enclosing at least the top thereof.

46. An apparatus as in claim 42, said double walled passage enclosing the top and sides of said heat extractor chamber.

47. An apparatus as in claim 36, a plurality of heat exchanger means in said heat extractor chamber, means in said heat extractor chamber operable to direct the flow of hot waste gases to selected ones of said heat exchanger means.

48. An apparatus as in claim 36, said vent means being normally closed and openable to exhaust the hot waste gases outward to the atmosphere from said heat extractor chamber after the same have flowed through at least a portion of said heat extractor chamber.

49. An apparatus as in claim 36, an opening to the atmosphere in said reverse flow passage, and normally closed operable valve means closing said opening to the atmosphere and operable to open said opening in response to a pressure in said heat extractor chamber that is greater than that of the hot waste gases at said flue head to permit the hot waste gases to flow through said reverse flow passage and opening to the atmosphere before entering into said heat extractor chamber.

50. An apparatus as in claim 36,
means in said heat exchanger operable to increase the movement of the fluid therein.

51. An apparatus as in claim 50,
means in said flue means to increase the flow of hot waste gases from said source to said heat extractor chamber.

52. An apparatus as in claim 36,
a second heat extractor in fluid connection with said first heat extractor to receive from the first heat extractor some of the waste gases flowing through a portion thereof to extract heat therefrom,
said second heat extractor including vent means to direct a downward exhaust of the waste gases before the waste gases exhaust therefrom to the atmosphere.

53. An apparatus as in claim 52,
and fluid containing heat exchanger means in said second heat extractor for the passage of waste gases therethrough before the waste gases exhaust to the atmosphere.

* * * * *